United States Patent
Teranishi (10) Patent No.: US 10,749,671 B2
(45) Date of Patent: Aug. 18, 2020

(54) SECURE COMPUTATION SYSTEM, SERVER APPARATUS, SECURE COMPUTATION METHOD, AND PROGRAM

(71) Applicant: NEC CORPORATION, Tokyo (JP)

(72) Inventor: Isamu Teranishi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 362 days.

(21) Appl. No.: 15/562,659

(22) PCT Filed: Apr. 1, 2016

(86) PCT No.: PCT/JP2016/060941
§ 371 (c)(1),
(2) Date: Sep. 28, 2017

(87) PCT Pub. No.: WO2016/159357
PCT Pub. Date: Oct. 6, 2016

(65) Prior Publication Data
US 2018/0115415 A1    Apr. 26, 2018

(30) Foreign Application Priority Data
Apr. 3, 2015 (JP) .................................. 2015-077064

(51) Int. Cl.
*H04L 9/08* (2006.01)
*G06F 21/74* (2013.01)
(Continued)

(52) U.S. Cl.
CPC ............ *H04L 9/085* (2013.01); *G06F 7/50* (2013.01); *G06F 7/523* (2013.01); *G06F 21/602* (2013.01);
(Continued)

(58) Field of Classification Search
None
See application file for complete search history.

(56) References Cited

U.S. PATENT DOCUMENTS 9,270,414 B2 * 2/2016 Shokrollahi ........... H04L 1/0041
2015/0193633 A1 * 7/2015 Chida ..................... G06F 21/60
726/26

FOREIGN PATENT DOCUMENTS

JP    2009-037093 A    2/2009
JP    2011199821 A    10/2011
(Continued)

OTHER PUBLICATIONS

Adi Shamir, "How to Share a Secret", Communications of the ACM, Nov. 1979, pp. 612-613, vol. 22, No. 11.
(Continued)

*Primary Examiner* — Brandon S Hoffman
(74) *Attorney, Agent, or Firm* — Sughrue Mion, PLLC (57) ABSTRACT

A secure computation system configured to perform multi-party computation on a value of a predetermined function whose argument includes secret data, comprises a plurality of server apparatuses; wherein the plurality of server apparatuses, comprise: storage units that store shares that are bases over (of) a finite field generated by performing secret sharing on the secret data; share expansion units that generate extended shares by expanding the shares; OR operation units that perform OR operations included in the predetermined functions using the extended shares; and NOT operation units that perform NOT operations included in the predetermined functions using the extended shares.

13 Claims, 3 Drawing Sheets

(51) Int. Cl.
*G06F 21/60* (2013.01)
*G06F 7/50* (2006.01)
*G06F 7/523* (2006.01)

(52) U.S. Cl.
CPC ............ *G06F 21/74* (2013.01); *H04L 9/0819* (2013.01); *H04L 9/0894* (2013.01)

(56) References Cited

FOREIGN PATENT DOCUMENTS

JP 2014-164145 A 9/2014
WO 2014/007311 A1 1/2014

OTHER PUBLICATIONS

Oded Goldreich et al. "How to Play Any Mental Game or a completeness Theorem for Protocols with Honest Majority", in proceedings of the Nineteenth Annual ACM Conference on Theory of Computing, ACM Press, 1987, pp. 218-229.

Naoto Kiribuchi et al., "Improving Efficiency of Multi-party Computation and Its Application to Secret Shared Database Searches", Dai 29 Kai Symposium on Cryptography and Information Security (SCIS 2012), Jan. 2012.

International Search Report for PCT/JP2016/060941, dated Jun. 28, 2016.

Notice of Reason for Refusal dated Oct. 15, 2019 from the Japanese Patent Office in application No. 2017-510254.

Kato, R., et al., "Accelerating Bit-wise Calculation in Multi-party Computation by Partially Using Small Prime", Information Processing Society of Japan, vol. 55, No. 9, (Sep. 2014), pp. 1971-1991 (24 pages).

Chida, K., et al., "Efficient 3-Party Secure Function Evaluation and Its Application", Information Processing Society of Japan, vol. 2010, No. 1, Mar. 4, 2010, pp. 1-7 (8 pages).

\* cited by examiner

SECURE COMPUTATION SYSTEM, SERVER APPARATUS, SECURE COMPUTATION METHOD, AND PROGRAM

REFERENCE TO RELATED APPLICATION

This application is a National Stage of International Application No. PCT/JP2016/060941 filed Apr. 1, 2016, claiming priority based on Japanese patent application No. 2015-077064, filed on Apr. 3, 2015, the disclosure of which is incorporated herein in its entirety by reference thereto.

FIELD

The present invention relates to a secure computation system, a server apparatus, a secure computation method, and a program, and particularly to a secure computation system, a server apparatus, a secure computation method, and a program based on a multi party computation method.

BACKGROUND

First, background art of the present invention and necessary terms to describe the present invention will be described.

A secret sharing scheme (Share, Reconst) is a protocol for sharing a secret a that a user holds with a plurality of server apparatuses 1 to N, and for holding the secret a. And, the secret sharing scheme (Share, Reconst) is composed from a share generation function Share that generates a "share" from the secret a and a reconstruction function Reconst that reconstructs the secret a from the "share". In many cases including a scheme described in Non-Patent Literature 1 (NPL1), the secret a and the share are element of a finite field. In the present disclosure herein, a situation where the secret a and the share are elements of the finite field will be considered. In the following, the secret sharing scheme in such situation will be described.

Assumed that F is a finite field, secret sharing where the secret a and the share are elements of the finite field F is called "secret sharing in F". In addition, the share generated by "secret sharing in F" is called "share of secret a over F" or "share of secret a in F".

Inputs and outputs of the Share function and the Reconst function are as below.

The share generation function Share receives, as an input, the secret a, server apparatus number N, and the finite field F (or information regarding the finite field F), then, outputs the shares of the secret a s[1], ..., s[N].

The reconstruction function Reconst receives, as an input, a part or whole of the shares s[1], ..., s[N] and the finite field F (or the information regarding the finite field F), then, outputs the secret a or data indicating a "failure of reconstruction".

The secret sharing scheme (Share, Reconst) is used with the following procedures. First, when a user U shares the secret a with the server apparatuses 1 to N, the user U acquires shares s[1], ..., s[N]∈F as output by executing the Share(a, N, F). Next, the user respectively transmits the shares s[1], ..., s[N] to the server apparatuses 1 to N. In future, in a case where it is necessary to reconstruct from the secret from the share, server apparatuses i_1 to i_v that satisfy {i_1, ..., i_v}∈Access transmit their own shares, s[i_1], ..., s[i_v], to the user U. Next, the user U acquires the secret a by executing the Reconst (s[i_1], ..., s[i_v], F).

In the above, a case where the user U executes the Reconst (s[i_1], ..., s[i_v], F) has been described. It should be noted that, a user other than the user U or the server apparatus may execute the Reconst (s[i_1], ..., s[i_v], F).

Further, when a group Access that is a subset of {1, ..., N} satisfies the below, the group Access is called an access structure over {1, ..., N}.

If S∈Access and S⊂T, then T∈Access

In addition, when (Share, Reconst) satisfies the following characteristic, the (Share, Reconst) is called "Access safe".

Assumed that s[1], ..., s[N] are outputs of Share(a, N, F), and S={i_1, ..., i_v} is a subset of {1, ..., N}. In this case, if S∈Access, Reconst(s[i_1], ..., s[i_v], F) outputs the secret a. On the other hand, if S∈Access is not satisfied, any partial information of the secret a cannot be known from s[i_1], ..., s[i_v].

Shamir's Secret Sharing Scheme

Next, a secret sharing scheme proposed by Shamir in Non-Patent Literature 1 (in the following, called "Shamir's secret sharing scheme") will be described. In Shamir's secret sharing scheme, a natural number K called a "threshold value" is determined and fixed in advance. Note that, it is necessary that the threshold value K is not more than the server apparatus number N.

The Access in Shamir's secret sharing scheme is Access={S⊂{1, ..., N}|S including elements not less than the number K}. Hence, in Shamir's secret sharing scheme, if server apparatuses not less than the K among the server apparatuses 1 to N are gathered, it is possible to reconstruct a secret. On the other hand, in Shamir's secret sharing scheme, even if server apparatuses less than K are gathered, it is not possible to acquire information regarding the secret at all.

Shamir's secret sharing scheme is a secret sharing scheme over a finite field. Assumed that F is a finite field, a share function and reconstruction function in Shamir's secret sharing scheme is respectively expressed as ShamirShare(a, K, N, F) and ShamirReconst(s[i_1], ..., s[i_v], K, N, F). Here, a∈F is a secret, and s[i_1], ..., s[i_v] is "share". In addition, the ShamirShare function and ShamirReconst function are defined as below.

ShamirShare(a, K, N, F): Selecting random numbers r[1], ..., r[K−1] in random, defining a polynomial f(X) over the finite field F for i=1 to N based on $$f(X) = a + \Sigma_{k=1,\ldots,K-1} r[k] X^k,$$

computing s[i]=f(i), and returning s[1], ..., s[N] as the shares of the server apparatuses 1 to N.

ShamirReconst(s[i_1], ..., s[i_v], K, N, F): If v is not less than K, outputting f(0) a result of calculation of K−1 order polynomial f(X) over the finite field F satisfying f(i_u)=s[i_u] for arbitrary u=1, ..., v. On the other hand, if v is less than K, returning a message telling that it is not possible to reconstruct secret data.

MPC (Multi Party Computation) Protocol

The term "MPC protocol" means a means that calculates some algorithm by a plurality of server apparatuses in a secure manner. In the present disclosure herein, a "multiplication modulo MPC protocol" and a "random number generation MPC protocol" are used as the MPC protocol.

In the multiplication modulo MPC protocol, s[1], ..., s[N] are shares of some integer a over the finite field F. On the other hand, s[1], ..., s[N] are shares of some integer b over the finite field F.

The term "multiplication modulo MPC protocol" means an MPC that executes a multiplication modulo algorithm in a secure manner, in which server apparatuses 1 to M[N] are respectively executed inputting (s[1], t[1], F), . . . , (s[N], t[N], F), and respectively receives z[1], . . . , z[N] as an output. Here, z[1], . . . , z[N] are "shares" in the F of a product ab in the F.

On the other hand, the term "random number generation MPC protocol" means an MPC that executes a random number generation algorithm in a secure manner, in which the server apparatuses 1 to N are respectively executed inputting the finite field F, and respectively receive u[i], . . . , u[N] as an output. Here, u[i], . . . , u[N] are "shares" in F of uniform random numbers over (in) the finite field F.

As methods to realize these protocols, various methods (for example, a method described in Non-Patent Literature 2 (NPL2)) can be used.

In addition, Patent Literature 1 (PTL 1) describes a technique dividing input secure information with partial secure information; generating partial distributed (sharing) information by executing an EXCLUSIVE-OR operation between divided partial secure information and random numbers or the partial secure information; generating sharing information linking generated partial sharing information; and transmitting generated sharing information to predetermined number of managers.

PTL1 Japanese Patent Kokai Publication No. 2009-037093A

NPL1

A. Shamir, "How to Share a Secret" Communications of the ACM, November 1979, Volume 22, Number 11, pp. 612-613.

NPL2

O. Goldreich, S. Micali, and A. Wigderson, "HOW TO PLAY ANY MENTAL GAME or A completeness Theorem for Protocols with Honest Majority," in Proceedings of the Nineteenth Annual ACM Conference on Theory of Computing, ACM Press, 1987, pp. 218-229.

SUMMARY

The entire disclosures of the above Patent Literature 1 and Non-Patent Literatures 1 and 2 are incorporated herein by reference thereto. The following analyses are made by the present inventor.

Because of spread of cloud computing technology, a service, to allow a user to deposit data in a database provided in the cloud, etc. and to allow the user to utilize data by retrieving for necessary data among data deposited in the database, is becoming common.

However, in such service, a manager of the database can view all data that the user deposits. Therefore, once the user deposits data in a database, there is a risk to be leaked user's privacy to the manager of the database.

In order to avoid such risk, it can be considered that the user encrypts data to be deposited in the database. However, once encrypting data, when the user want to retrieve for necessary data from the database after encrypting the data, a problem where the data cannot be retrieved is caused, since the data cannot be read through encryption.

As a technique to solve such dilemma, a technique called MPC (Multi-Party Computation) protocols is known. The MPC protocol is a protocol to calculate necessary values $\varphi(a[1] \ldots a[m])$ in a secure manner according to some algorithm $\varphi$, being started from a state where the data $a[1], \ldots, a[m]$ are held in a plurality of server apparatuses being "shared" with the plurality of server apparatuses. Here, the "share" is generated from a secret sharing scheme.

Related art regarding multi-party computation proposes multi-party computation methods of AND, OR and NOT logical operators. Further, for normal $\varphi$ function, the related art expresses the $\varphi$ function as logical operators such as AND, OR and NOT, and realizes multi-part computation of the $\varphi$ by combining the multi-party computation methods of the AND, OR and NOT logical operators.

In multi-party computation according to the related art, in order to execute an AND operation, a server apparatus group needs to perform communications of a predetermined number of rounds. Therefore, in order to compute a[1] AND . . . AND a[J] that are performed AND operations of J bit, a[1] to a[J], at least O (log J) rounds are required.

For example, under a situation where X rounds are required for one AND operation, in order to compute a[1] AND . . . AND a[8] that are performed AND operations of 8 bit data (J=8), it is necessary to perform the following computations.

For 1 to X rounds, performing multi-party computation on b[1]=a[1] AND a[2], b[2]=a[3] AND a[4], b[3]=a[5] AND a[6], b[4]=a[7] AND a[8]

For X+1 to 2X rounds, performing multi-party computation on c[1]=b[1] AND b[2], c[2]=b[3] AND b[4]

For 2X+1 to 3X rounds, performing multi-party computation on c[1] AND c[2]. Therefore, AND operation $3X=(\log_2 8) \cdot X$ rounds in total are required.

As described above, when performing AND operation on multiple data, there is a problem that the multi-party computation according to the related art needs multiple number of rounds.

Particularly, in a case of applying the multi-party computation to a retrieval, the above problem becomes remarkable. For example, when attempting to retrieve bit string a=a[1] . . . a[n] including a query b=b[1] . . . b[m] as a subset bit string, the $\varphi$ satisfying $\varphi(a, b)=1$ (a case where the v is a partial bit string of the a) may be adopted, or otherwise, $\varphi(a, b)=0$ may be adopted.

Here, the case where the b is a partial bit string of the a is equal to a case where the following logical equation is satisfied, $\exists j (b[j+1]=a[j+1])$ AND . . . AND $(b[j+n]=a[j+n])$. Therefore, in order to determine whether or not the b is a partial bit string, it is necessary to perform multi-party computation of AND operation on N data, thus requiring multiple number of round.

Note that, the technique described in Patent Literature 1 also cannot solve such problem.

Therefore, reduction of the number of rounds in multi-party computation is a problem. It is an object of the present invention to provide a secure computation system, a server apparatus, a server computation method, and a program that contributes to solving the above problem.

A secure computation system according to a first aspect is a secure computation system configured to perform multi-party computation on value of a predetermined function whose argument includes secret data, comprising: a plurality of server apparatuses; wherein the plurality of server apparatuses comprise: storage units that store shares that are elements of a finite field generated by performing secret sharing on the secret data; share expansion units that generate extended shares by expanding the shares; OR operation units that perform OR operations included in the predetermined functions using the extended shares; and NOT operation units that perform NOT operations included in the predetermined functions using the extended shares.

A server apparatus according to a second aspect is one of the plurality of server apparatuses included in the secure computation system according to the first aspect.

A secure computation method according to a third aspect is a secure computation method, used in a plurality of computers that perform a multi-party computation on value of a predetermined function whose argument includes secret data, comprising: receiving shares that are elements of a finite field generated by performing secret sharing on the secret data; generating extended shares by expanding the shares; performing OR operations included in the predetermined functions using the extended shares; and performing NOT operations included in the predetermined functions using the extended shares.

A program according to a fourth aspect is a non-transitory computer-readable recording medium storing thereon a program causing one of a plurality of computers to perform a multi-party computation on value of a predetermined function whose argument includes secret data, to execute the processings of: receiving shares that are elements of a finite field generated by performing secret sharing on the secret data; generating extended shares by expanding the shares; performing OR operations included in the predetermined functions using the extended shares; and performing NOT operations included in the predetermined functions using the extended shares. Note, the program can be provided as a program product recorded on a non-transitory computer-readable storage medium.

The meritorious effects of the present invention are summarized as follows.
According to the secure computation system, the server apparatus, the secure computation method, and the program of the present invention, it becomes possible to decrease the number of rounds for the multi-party computation. That means that the present invention transforms the secure computation system into that is improved so as to decrease the number of rounds for the multi-party computation.

PREFERRED MODES

Outline of the Present Disclosure

First, the following describes an overview (basic idea) of the present disclosure.

The multi-party computation according to the related art is constructed as below.

Making multi-party computation calculating a summation and multi-party computation calculating a multiplication.

Making multi-party computation performing an AND operation, multi-party computation performing a NOT operation, and multi-party computation performing an OR operation by combining the multi-party computation calculating the summation and the multi-party computation calculating the multiplication.

Since an arbitrary function can be expressed by an AND operator, a NOT operator, and an OR operator, the arbitrary function is realized by combining the above multi-party computation of AND, NOT and OR operations.

In the above case, it is known that the multi-party computation of a summation is realized with zero rounds (that is, without performing a communication between server apparatuses). On the other hand, it is known that the multi-party computation of multiplication needs a predetermined certain number of rounds.

The multi-party computation of AND, OR and NOT operations are realized based on the multi-party computation of multiplication. Therefore, the multi-party computation of these logical operators also need a constant number of rounds. Particularly, in order to perform the multi-party computation of an AND operation on a plurality of data, multiple rounds are required as described above.

Therefore, the present disclosure realizes multi-party computation of a NOT operation and multi-party computation of an OR operation on a plurality of data by performing multiplications as few times as possible. In this way, the present disclosure contributes to improving of efficiency of rounds on multi-party computation. Note that, since an AND operator can be expressed by combining an OR operator and a NOT operator, multi-party computation of an AND operation can be realized by multi-party computation of OR and NOT operations.

In the present disclosure, the multi-party computation of the NOT operator and the multi-party computation of the OR operator on the plurality of data is respectively executed by the following idea.

First, a finite field F is fixed, then, operations to associate a basis 0 of the finite field F with a truth value "FALSE" and to associate an element other than 0 with a truth value "TRUE" are performed. Since each of bits used in multi-party computation is a truth value, either a basis 0 or an element other than 0 of the finite field F is assigned to respective bits according to whether the respective bits are FALSE or TRUE.

In order to perform multi-party computation on NOT a, multi-party computation of the share of $1-a^{q-1}$ may be performed using share of the a. Here, the q is an order of the finite field F.

According to Fermat's little theorem, if the a is 0, $1-a^{q-1}$ is 1, otherwise (i.e., a is not 0), $1-a^{q-1}$ is 0. Hence, according to the above computation, a NOT operation is performed.

On the other hand, in order to perform multi-party computation of OR of a[1], . . . , a[J], starting from a state where server apparatuses respectively have shares s[j, 1], . . . , s[j, N] of the finite field F of a[i] for i=1, . . . , J, respective server apparatuses n compute $\Sigma_{j=1, \ldots, J}\, s[j, n]u[j, n] \in F$ for n= 1, . . . , N. Here, $(u[j, n])_{n=1, \ldots, N}$ is a share of some random number r[i] of the finite field F.

Based on the forementioned definition, $(\Sigma_{j=1, \ldots, J} s[j, n]u[j, n])_{n=1, \ldots, N}$ is a share of $V=\Sigma_{j=1, \ldots, J} a[j]r[j]$. If a[1]= . . . =a[J]=0, V becomes 0, namely, this matches a[1] OR . . . , OR a[J]=0. On the other hand, if a[1], . . . , a[J] include a value other than 0, since r[j] is a random number, $V=\Sigma_{j=1, \ldots, J} a[j]r[j]$ becomes a value other than 0 with probability $1-(1/q)$. That is, by determining the q as large enough, V matches a[1] OR . . . OR a[J]=1 with high probability.

Based on the above discussion, by determining the order q as large enough of the finite field F, multi-party computation of a NOT operator and an OR operator can be performed correctly with high probability.

Therefore, it can be considered to set the order q as a large value. However, as the q increases, a dilemma that an efficiency of rounds for an operation on the NOT operator deteriorates is caused since the NOT operator is realized by the multi-party computation on $1-a^q$.

In the present disclosure herein, such dilemma is solved by two ways. Note that, the following solution methods 1 and 2 are respectively adopted in a first and second example embodiments.

Solution 1

The first solution is as below. Namely, in order to solve the above dilemma, generating $\lambda$ pairs of shares $(s[n, 1])_{n=1, \ldots, N}, \ldots, (s[n, \lambda])_{n=1, \ldots, N}$ while keeping the order q of the finite field F as small, instead by performing secret sharing $\lambda$ times on a single value a, a server apparatus n holds $(s[n, 1], \ldots, s[n, \lambda])$. Here, $\lambda$ is a security parameter. In addition, $(s[n, 1], \ldots, s[n, \lambda])$ are called "extended shares" of the a.

The values shared by $(s[n, 1])_{n=1, \ldots, N}, \ldots, s([n, \lambda])_{N=1, \ldots, N}$ and the extended shares $(s[n, 1], \ldots, s[n, \lambda])_{n=1, \ldots, N}$ are put respectively $u[1], \ldots, u[\lambda]$. In this case, if $u[1]= \ldots =u[\lambda]=0$, it is determined that the extended shares share FALSE, otherwise, it is determined that the extended shares share TRUE.

{OR Operation in the Solution 1}

In an OR operation, as described above, for respective components $s[n, 1], \ldots, s[n, \lambda]$ of the extended shares, a summation of products of random numbers and the respective components of the extended shares are computed. In this solution, computing "a summation of products of random numbers and the respective components of the extended shares" is repeated $\lambda$ times. Therefore, a probability of a failure of an OR operation becomes $1/q^\lambda$, thus, the probability of the failure exponentially decreases versus $\lambda$. Hence, by making $\lambda$ be large, it is possible to make the probability of the failure small, while keeping q itself small. In this way, the above dilemma can be solved.

{NOT Operation in the Solution 1}

On the other hand, in a case of performing a NOT operation, suppose that values shared by $s[n, 1], \ldots, s[n, \lambda]$ be $u[1], \ldots, u[\lambda]$, an extended share of a share of the v is calculated by multi-party computation of share of $v=(1-u[1])^{q-1}) \ldots (1-u[\lambda]^{q-1})$. Based on Fermat's little theorem, if all of $u[1], \ldots, u[\lambda]$ are 0, $v=1$, otherwise, $v=0$. Therefore, the above computation corresponds to the NOT operator.

{Solution 2}

In the first solution, a procedure that converts a normal share to the extended share is introduced. On the other hand, in a second solution, as a conversion procedure, a method that adds a share of 0 over the F to a normal share is used. In the second solution, in order to solve the above dilemma, an order of an extended share L of the finite field F is enlarged, while an order q of the finite field F remains small. Further, according to necessity, a share of the finite field F is converted to a share of the expansion field L. A converted share is called an "extended share". In the second solution, a procedure that converts a normal share to the extended share is also introduced. It should be noted that, in the second solution, a method that adds a share of 0 in the expansion field L to a normal share is used as a converting method.

{OR Operation in the Solution 2}

In an OR operation, $\Sigma_{j=1, \ldots, J} T[j, n]u[J, n] \in L$ is computed. Here, T[j, n] is an extended share of a[j], and u[j, n] is a share of some random number over an expansion field L. Even if an order q of a finite field F is small, a probability of a failure of an OR operation becomes small by enlarging an order Q of the expansion field L. That is, the above dilemma is solved.

{NOT Operation in the Second Solution}

In order to perform multi-party computation on NOT a, a share of $1-a^{Q-1}$ is computed using an extended share of the a. Here, the Q is an order of the expansion field L. However, since it is necessary that the Q is large based on the above reason, when attempting to just perform multi-party computation on a share of $1-a^{Q-1}$, there is a problem that decreases an efficiency of the NOT operation. Therefore, an efficiency of computation of $a^Q$ is improved as below.

Since the L is the expansion field over the finite field F, the expansion field L is regarded as a linear space over (in) the finite field F. Therefore, assumed that $E[1], \ldots, E[\lambda]$ are elements of the linear space of the F, an arbitrary basis a of the expansion field L can be expressed as $\Sigma_{l=1, \ldots, \lambda} a[1]E[1]$. In addition, based on the definition, it is clear that $Q=q^\lambda$.

Therefore, $a^{Q-1}=(\Sigma_{l=1, \ldots, \lambda} a[1]E[1])^{\{q^\lambda-1\}}= \Sigma_{l=1, \ldots, \lambda}$ holds. $a[1]E[1]^{\{(1+q+ \ldots +q^{\lambda-1})(q-1)\}}= (\Pi_{i=0, \ldots, \lambda-1} \Sigma_{l=1, \ldots, \lambda} a[1]E[1])^{(q^i)^{q-1}}$ By performing multi-party computation on a right-hand side instead of left-hand side of the above equation, the NOT operation can be efficiently computed.

An Example Embodiment

Next, an outline of an example embodiment of the present disclosure will be described. In addition, reference symbols in the drawings attached to this outline are examples for the purpose of aiding understanding, and are not intended to limit the present disclosure to modes illustrated in the drawings.

Figure 1:
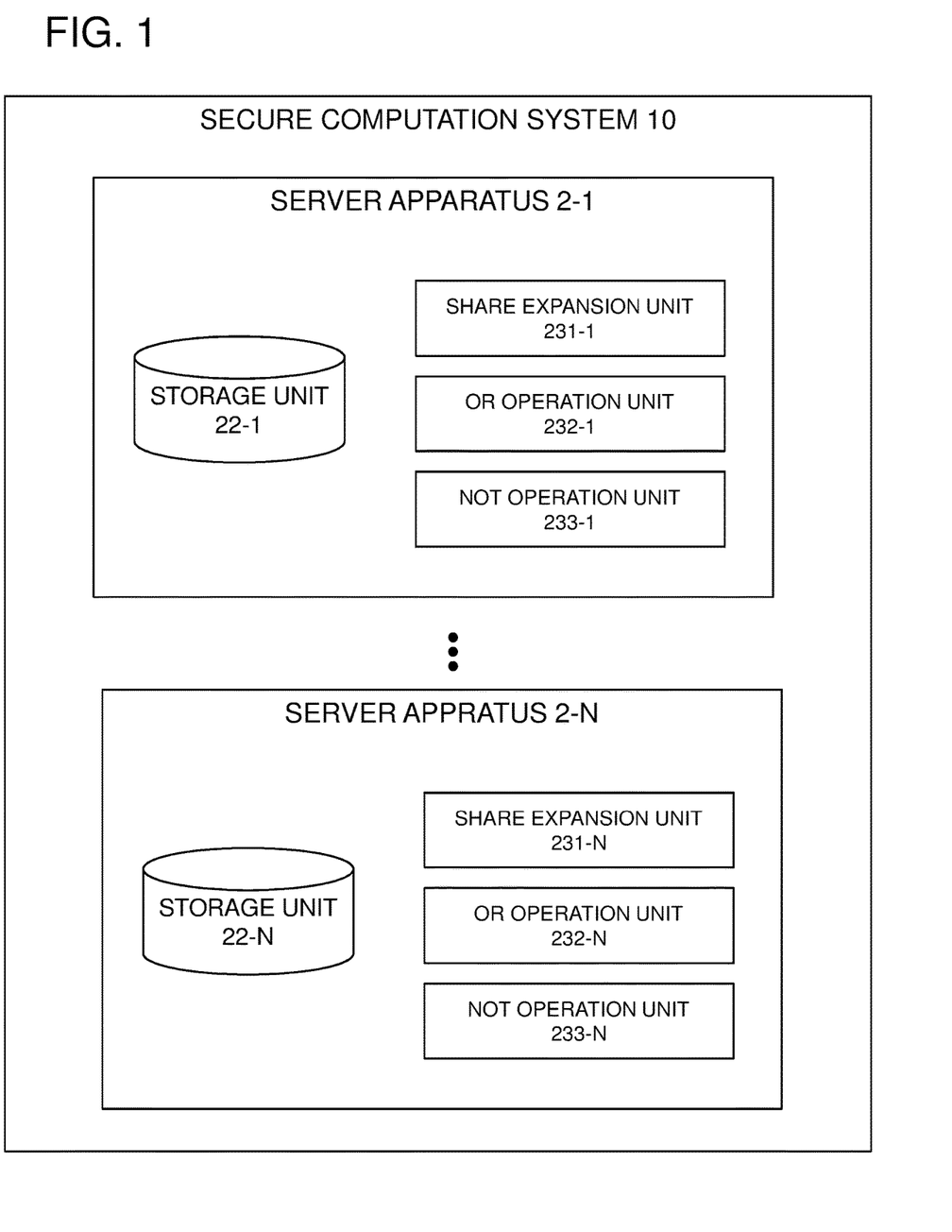
FIG. 1 is a block diagram illustrating an example of a configuration of a secure computation system according to an example embodiment.

FIG. 1 is a block diagram illustrating an example of a configuration of a secure computation system according to an example embodiment. Referring to FIG. 1, the secure computation system 10 is a secure computation system that performs multi-party computation on value of a predetermined function whose argument includes secret data, and comprises a plurality of sever apparatuses 2-1 to 2-N.

Server apparatuses 2-1 to 2-N comprise storage units 22-1 to 22-N that store shares that are elements of a finite field (F) generated by performing secret sharing on the secret data; share expansion unit 231-1 to 231-N that generate extended shares by expanding the shares; OR operation units 232-1 to 232-N that perform OR operations included in the predetermined functions using the extended shares; and NOT operation units 233-1 to 233-N that perform NOT operations included in the predetermined functions using the extended shares.

Here, the share expansion units 231-1 to 231-N may generate, as the extended shares, arrays whose components are a plurality of shares, generating the plurality of the shares by performing secret sharing on the shares. When the share expansion units 231-1 to 231-N generate the arrays, the OR operation units 232-1 to 232-N perform OR operations by multiplying shares of random numbers of the finite field (F) by respective components of the extended shares and computing a summation of the respective multiplied values. In addition, the NOT operation units 233-1 to 233-N compute raised values by raising respective values shared by respective components of the extended shares to power of (q−1) (i.e., power of a value where 1 is subtracted from an order (q) of the finite field); compute subtractions by subtracting the raised values from 1; compute products of the subtractions; and perform NOT operations by performing multi-party computation on the products.

On the other hand, the share expansion units 231-1 to 231-N may generate, as the extended share, values where a plurality of shares generated by performing secret sharing on the shares are expressed as elements of the expansion field L of the finite field (F). When the share expansion units 231-1 to 231-N generate the values, the OR operation units 232-1 to 232-N perform OR operations by multiplying shares of random numbers over the expansion field (L) by extended shares that are targets of the OR operations and computing a summation of the respective summations of the respective multiplied values. In addition, the NOT operation units 233-1 to 233-N express, by components with elements of the expansion field (L), extended shares that become targets of a NOT operation; compute raised bases elements by raising the elements corresponding to respective components to power of an order (q) of the finite field (F); compute multiplications of the raised elements with respective components; and compute a summation of the multiplications. The NOT operation units 233-1 to 233-N compute products of values shared with the computed summation; compute raised values by raising the computed products to power of (q−1) (i.e., a value where 1 is subtracted from an order (q) of the finite field (F)); compute a subtraction by subtracting the raised value from 1; and perform multi-party computation on the subtraction.

According to the secure computation system 10, it is possible to decrease the number of rounds in multi-party computation. This is because, according to the secure computation system 10, the order q of the finite field F is not enlarged, but the OR operator and the NOT operator can be correctly computed with high probability.

First Example Embodiment

Next, a secure computation system according to a first example embodiment will be described in the drawings. First, common configurations and operation between the present example embodiment and a second example embodiment described below will be described.

In the following, λ is a security parameter. In addition, N is a server apparatus number, and an order q over a finite field F is not less than the N. Further, {0, 1} is naturally regarded as a subset of the finite field F.
(Configuration)

Figure 2:
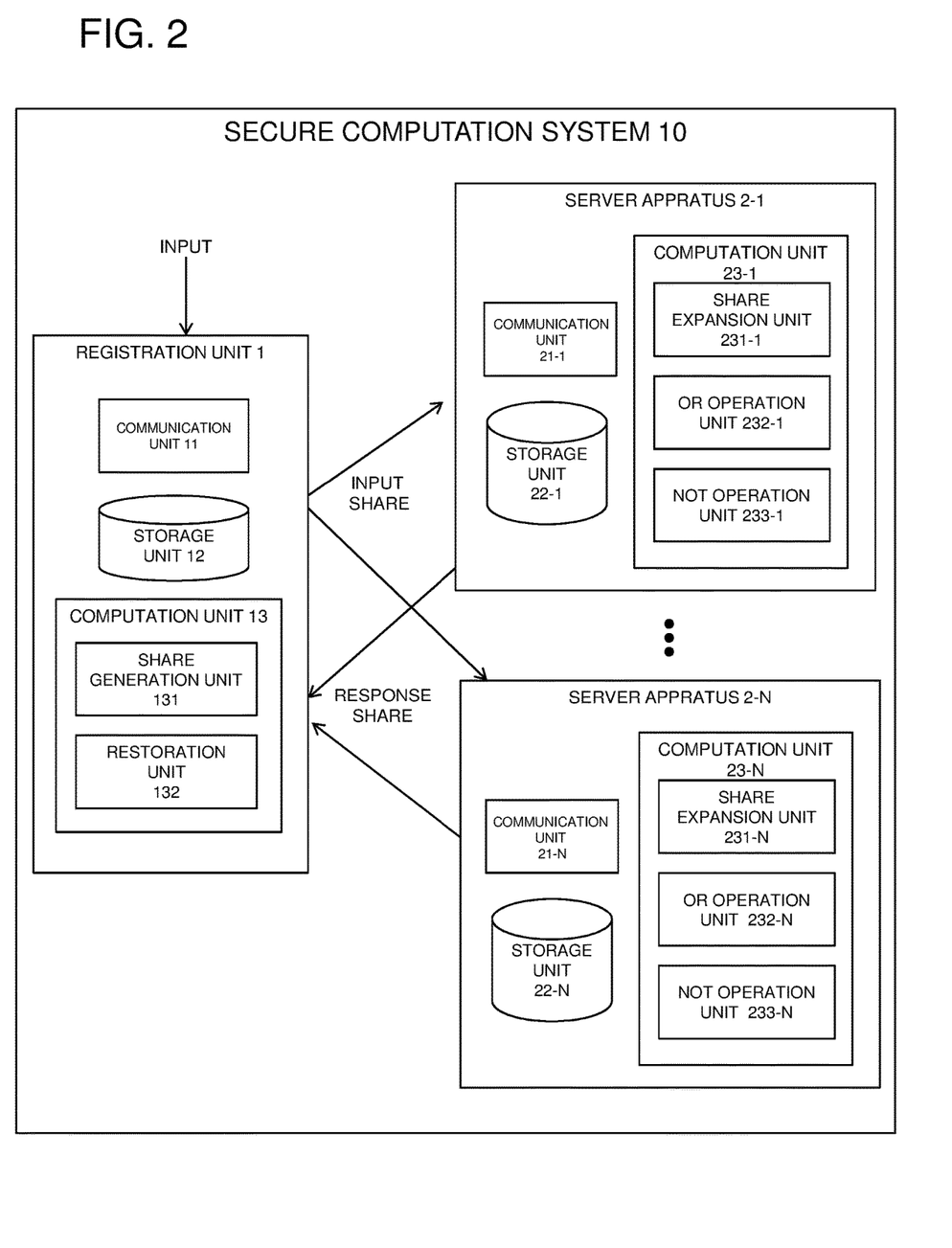
FIG. 2 is a block diagram illustrating an example of a configuration of a secure computation system according to first and second example embodiments.

FIG. 2 is a block diagram illustrating an example of a configuration of a secure computation system according to the present example embodiment. Note that, the secure computation system 10 in a second example embodiment described below also includes a similar configuration shown in FIG. 2.

With reference to FIG. 2, the secure computation system 10 comprises a register apparatus 1 and server apparatuses 2-1 to 2-N. Note that, at least one of the server apparatuses may serve as the register apparatus 1.

The register apparatus 1 comprises a communication unit 11, a storage unit 12, and a computation unit 13. In addition, the computation unit 13 comprises a share generation unit 131 and a restoration unit 132.

A server apparatus 2-n (n=1, . . . , N) comprises a communication unit 21-n, a storage unit 22-n, and a computation unit 23-n. In addition, the computation unit 23-n comprises a share expansion unit 231-n, an OR operation unit 232-n, and a NOT operation unit 233-n.

(Operation)

In the present example embodiment, Shamir's secret sharing scheme is used. Therefore, a threshold value K is fixed in advance. Further, respective different elements m[1], . . . , m[N] of a finite field F are fixed.

Assumed that a[1], . . . , a[U]∈{0, 1}∈F are secret data, and φ is a function. In the present example embodiment, the case of performing multi-party computation on φ(a[1], . . . , a[U]) is considered.

In this case, the following operations are performed.

Upon receiving the secret data a[1], . . . , a[U], the register apparatus 1 stores the received secret data a[1], . . . , a[U] in the storage unit 12. In addition, the share generation unit 131 of the register apparatus 1 performs "share generation" described below for u=1, . . . , U, and computes shares s[u, 1], . . . , s[u, U]. Next, the communication unit 11 of the register apparatus 1 transmits shares s[u, 1], . . . , s[u, N] to respective server apparatuses 2-1 to 2-N.

Upon receiving the shares s[u, 1], . . . , s[u, N] from the register apparatus 1, the communication units 21-1 to 21-N of the server apparatuses 2-1 to 2-N store received shares s[u, 1], . . . , s[u, N] in the storage units 22-1 to 22-N respectively. The share expansion units 231-1 to 231-N respectively compute extended shares of s[u, 1], . . . , s[u, N] performing "share expansion" before starting performing multi-party computation, and store computed extended shares in the storage unit 22-1 to 22-N.

The computation units 23-1 to 23-N of server apparatuses 2-1 to 2-N expresses (by constructing) the function φ by a combination of an OR gate and a NOT gate, and perform multi-party computation in sequence on the OR gate and the NOT gate using an extended share of a[u] for u=1, . . . , U as an input. Details of the multi-party computation on the OR gate will be described in a recitation regarding "OR operation" below. Details of the multi-party computation on the NOT gate will be described in a recitation regarding "NOT operation" below. Finally, the server apparatuses 2-1 to 2-N acquire shares of the φ(a[1], . . . , a[U]).

Upon finishing computing the shares of respective bits of φ(a[1], . . . , a[U]), the communication units 21-1 to 21-N of the server apparatuses 2-1 to 2-N transmit computed shares to the register apparatus 1. The restoration unit 132 of the register apparatus 1 restores the φ(a[1], . . . , a[U]) by performing "restoration computation" described below.

In the above, a case where the share expansion units 231-1 to 231-N are configured to expand shares in the server apparatuses 2-1 to 2-N has been described. It should be noted that, the share expansion may be performed on the side of the register apparatus 1. In this case, the communication unit 11 of the register apparatus 1 does not transmit, to the server apparatuses 2-1 to 2-N, the shares s[u, 1], . . . , s[u, N] themselves but the extended shares acquired by performing the share expansion for the shares.

Next, details of a share generation will be described. The share generation operation is common through the present example embodiment and a second example embodiment described below.
{Share Generation}

In the first and second example embodiments, assumed that a secret a is a basis of {0, 1}. It should be noted that, even if the secret a is not a basis of {0, 1}, if the secret a is a basis of F, the following share generation operation correctly works. Note that, in third and fourth example embodiments described below, the following share generation operation is used even if the secret a is not limited to the basis of {0, 1}.

The register apparatus 1 receives the secret a∈F as an input.

The share generation unit 131 selects random numbers r[1], . . . , r[K−1]∈F in random; for i=1, . . . , N, defines a polynomial f(X) of the finite field F as f(X)=a+$\Sigma_{k=1, \ldots, K-1}$ r[k]X$^k$; and, for n=1, . . . , N, computes s[n]=f(m[n]). The communication unit 11 transmits computed shares s[1], . . . , s[N] to respective server apparatuses 2-1 to 2-N.

The server apparatuses 2-1 to 2-N store received shares s[1], . . . , s[N] in the storage units 22-1 to 22-N.

Operations of "share expansion", "OR operation", "NOT operation" and "restoration computation" differ between the present example embodiment and the second example embodiment described below. In the following, the operations of "share expansion", "OR operation", "NOT operation" and "restoration computation" according to the present example embodiment will be described.

{Share Expansion}

The share expansion units 231-1 to 231-N of the server apparatuses 2-1 to 2-N respectively read the shares s[1], . . . , s[N] from the storage units 22-1 to 22-N.

The share expansion units 231-1 to 231-N perform random number generation MPC protocol to l=1, . . . , λ and d=1, . . . , D and generate share of the uniform random number r[l, d] ever of the finite field F. The share expansion units 231-1 to 231-N acquire share ρ[l,d,1], . . . , ρ[l,d,N] of r[l, d] respectively as a result of the performance.

For n=1, . . . , N and l=1, . . . , λ, the share expansion unit 231-$n$ computes t[n, 1]=s[n]+$\Sigma_{d=1, \ldots, D}$ ρ[l, d, n]m[n]$^d$.

For n=1, . . . , N, the share expansion unit 231-$n$ outputs (t[n, 1], . . . , t[n, λ]) as an extended share.

{OR Operation}

For j=1, . . . , J, when the server apparatuses 2-1 to 2-N store the extended shares (t[j, 1, 1], . . . , t[j, 1, λ])∈F$^λ$, . . . , (t[j, N, 1], . . . , t[j, N, λ])∈F$^λ$ in respective storage units 22-1 to 22-N, the OR operation units 232-1 to 232-N of the server apparatuses 2-1 to 2-N compute shares of b=a[1] OR . . . OR a[J] as below.

For j=1, . . . , J, the OR operation units 232-1 to 232-N respectively read the extended shares (t[j, 1, 1], . . . , t[j, 1, 1, λ])∈F$^λ$, . . . , (t[j, N, 1], . . . , t[j, N, λ])∈F$^λ$ from the storage units 22-1 to 22-N.

The OR operation units 232-1 to 232-N respectively perform a random number generation MPC, Jλ times. As a result of this, for j=1, . . . , J and l=1, . . . , λ, the OR operation units 232-1 to 232-N acquire shares u[j, 1, 1], . . . , u[j, N, 1] of a random number R[j, 1] of the finite field F.

For n=1, . . . , N and 1=1, . . . , λ, the OR operation unit 232-$n$ computes v[n, 1]=$\Sigma_{j=1, \ldots, J}$ t[j, n, 1]u[j, n, 1]∈F, and stores (v[n, 1], . . . , v[n, λ]) in the storage unit 22-$n$ as extended shares of the b.

{NOT Operation}

When the server apparatuses 2-1 to 2-N store the extended shares (t[1, 1], . . . , t[1, λ])∈F$^λ$, . . . , (t[N, 1], . . . , t[N, λ])∈F$^λ$ in the storage units 22-1 to 22-N, NOT operation units 233-1 to 233-N of the server apparatuses 2-1 to 2-N compute share of b=NOT a as below.

The NOT operation units 233-1 to 233-N respectively read extended shares (t[1, 1], . . . , t[1, λ])∈F$^λ$, . . . , (t[N, 1], . . . , t[N, λ])∈F$^λ$ of the secret a from the storage units 22-1 to 22-N. Based on a definition of the extended share, (t[n, 1]) n=1, . . . , N are secret sharing of some basis c[n]∈F.

For n=1, . . . , N and l=1, . . . , λ, a NOT operation unit 233-$n$ performs multi-party computation that acquires a share of d[l]=1−c[l]$^{q-1}$ using t[n, l]∈F as an input. The NOT operation unit 233-$n$ performs such multi-part computation by combining multi-party computation on a summation over (in) the finite field F and multi-party computation on a product of the finite field F. Here, the q is an order of the finite field F. As a result of this computation, the NOT operation units 233-1 to 233-N respectively acquire shares δ[1, 1], . . . , δ[N, 1].

For n=1, . . . , N, the NOT operation unit 233-$n$ performs multi-party computation that acquires a share of e= d[1] . . . d[λ] using δ[n, 1], . . . , δ[n, λ]∈F as an input. As a result of this computation, the NOT operation units 233-1 to 233-N respectively acquire shares ε[1], . . . , ε[N].

For n=1, . . . , N, the share expansion unit 231-$n$ performs an share expansion to ε[n] as an input, and writes the acquired extended share as a result of the share expansion to the storage unit 22-$n$.

{Restoration Computation}

The restoration unit 132 of the register apparatus 1 receives, as an input, extended shares (t[i_1, 1], . . . , t[i_1, λ])∈F$^λ$, . . . , (t[i_v, 1], . . . , t[i_v, λ])∈F$^λ$, where v (v≥K) holds.

For l=1, . . . , λ, the restoration unit 132 performs ShamirReconst(t[i_1, 1], . . . , t[v_1, 1], K, N, F), then, acquires a[l].

If a[1]= . . . =a[λ]=0, the restoration unit 132 outputs 0, otherwise, the restoration unit 132 outputs 1.

According to the secure computation system of the present example embodiment, it is possible to decrease the probability of the failure in the OR operation (computation), while q itself of the finite field F remains small. Therefore, according to the present example embodiment, multi-party computation can be performed correctly with high probability without deteriorating an efficiency of rounds.

Second Example Embodiment

Next, a secure computation system according to a second example embodiment will be described with reference to the drawings.

(Configuration)

FIG. 2 is a block diagram illustrating an example of a configuration of a secure computation system 10 according to the present example embodiment. Since a configuration of the secure computation system 10 of present example embodiment is same as that of the secure computation system of the first example embodiment, explanation about the configuration of the secure computation system 10 of present example embodiment will be omitted.

In the present example embodiment, a finite field F whose order q is not less than a server apparatus number (count) N is used. In addition, respectively different elements m[1], . . . , m[N] of the finite field F are fixed.

Further, in the present example embodiment, the term L means an expansion field of the finite field F, and an expansion order is not less than a security parameter λ. Based on the definition of the expansion field L, the expansion field L can be regarded as λ order vector space in the F. Therefore, elements E[1], . . . , E[λ]∈L in the expansion field L that is the λ order vector space of the finite field F are fixed.

(Operation)

Next, operations of the secure computation system of the present example embodiment will be described. Note that, since a share generation operation of the present example embodiment is same as that of the first example embodiment, explanation about the share generation operation is omitted. In the following, operations of "share expansion", "OR operation", "NOT operation" and "restoration computation" of the present example embodiment will be described.

{Share Expansion}

For n=1, . . . , N and l=1, . . . , $\lambda$, as same as the first example embodiment, the share expansion unit 231-1 of the server apparatus 2-*n* computes t[n, l]=s[n]+$\Sigma_{d=1, \ldots, D}\rho$[l, d, n]m[n]$^d$. In the present example embodiment, the share expansion unit 231-*n* (n=1, . . . , N) computes T[n]= $\Sigma_{l=1, \ldots, \lambda}$t[n,l]E[l], then, outputs computed T[n] as an extended share.

{OR Operation}

For j=1, . . . , J, when the server apparatuses 2-1 to 2-N respectively store the extended shares T[j, 1]$\in$L, . . . , T [j, N]$\in$L in the storage units 22-1 to 22-N, the OR operation units 232-1 to 232-N of the server apparatuses 2-1 to 2-N compute shares of b=a[1] OR . . . OR a[J] as below.

For j=1, . . . , J, the OR operation units 232-1 to 232-N respectively read the extended shares T[j, 1]$\in$L, . . . , T [j, N]$\in$L from the storage units 22-1 to 22-N.

The OR operation units respectively perform random number generation MPC J times. As a result of this computation, for j=1, . . . , J, the OR operation units 232-1 to 232-N respectively acquire shares u[j, 1], . . . , u[j, N]$\in$L of a random number R[j] in the expansion field L.

For n=1, . . . , N, the OR operation unit 232-*n* computes v[n]32 $\Sigma_{j=1, \ldots, J}$T[j, n]u[j, n]$\in$L, and stores v[n] in the storage unit 22-*n* as an extended share of b.

{NOT Operation}

When the server apparatuses 2-1 to 2-N respectively store the extended shares T[1]$\in$L, . . . , T[N]$\in$L of the a in the storage units 22-1 to 22-N, the NOT operation units 233-1 to 233-N of the server apparatuses 2-1 to 2-N compute a share of b=NOT a as below.

The NOT operation units 233-1 to 233-N respectively read the extended shares T[1]$\in$L, . . . , T[N]$\in$L of the secret a from the storage units 22-1 to 22-N. Based on the definition of the extended shares, T[1], . . . , T[N] are shares of secret sharing on the a.

For n=1, . . . , N, the NOT operation unit 233-*n* expresses (by developing into) T[n] into components T[n]= $\Sigma_{l=1, \ldots, \lambda}$t[n, l]E[l] (t[n, l]$\in$F). Then, for y=1, . . . , $\lambda$, the NOT operation unit 233-*n* computes $\delta$[n, y]= $\Sigma_{l=1, \ldots, \lambda}$t[n, l]E[l]$^{\wedge}$(q$^u$). Here, the q is an order of the finite field F. Based on the definition of the extended shares, $\delta$[n, y] is a share of secret sharing on certain basis d[y].

For n=1, . . . , N, the NOT operation unit 233-*n* performs multi-party computation that acquires a share of e=1– (d[1] . . . d[$\lambda$])$^{n-1}$ using $\delta$[n, 1], . . . , $\delta$[n, $\lambda$]$\in$L as an input. As a result of this computation, the NOT operation units respectively acquire shares $\epsilon$[1], . . . , $\epsilon$[N] of the e.

{Restoration Computation}

The restoration unit 132 of the register apparatus 1 receives extended shares T[i_1], . . . , T[i_v] whose number is them are v (v$\geq$K), as inputs.

For u=1, . . . , v, the restoration unit 132 expresses (by developing into) T[i_u] components T[i_u]= $\Sigma_{l=1, \ldots, \lambda}$t[i_u, l]E[l].

For l=1, . . . , $\lambda$, the restoration unit 132 performs ShamirReconst(t[i_1, l], . . . , t[i_v, l], K, N, F), then, acquires an output a[l].

If a[1]= . . . =a[$\lambda$]=0, the restoration unit 132 outputs 0, otherwise, the restoration unit 132 outputs 1.

According to the secure computation system 10 of the present example embodiment, it is possible to decrease a probability of a failure in the OR operation while keeping the order q of the finite field F as small. Therefore, according to the present example embodiment, an efficiency of rounds is not deteriorated, but multi-party computation can be performed correctly with high probability. In addition, when performing this computation, it becomes possible to prevent from decreasing an efficiency of the NOT operation.

Third Example Embodiment

Next, a secure computation system according to a third example embodiment will be described with reference to the drawings. The secure computation system of the present example embodiment is configured by applying the secure computation system of the first example embodiment to retrieving a character string (for example, retrieving a partial character string match).

In the following, N is a server apparatus number. In addition, in the present example embodiment, the term "character string" means a finite number series data called "word", wherein respective words are integers in a range from 0 to less than W. Further, as the finite field F according to the first example embodiment, assumed that an order q is not less than W.

(Configuration)

Figure 3:
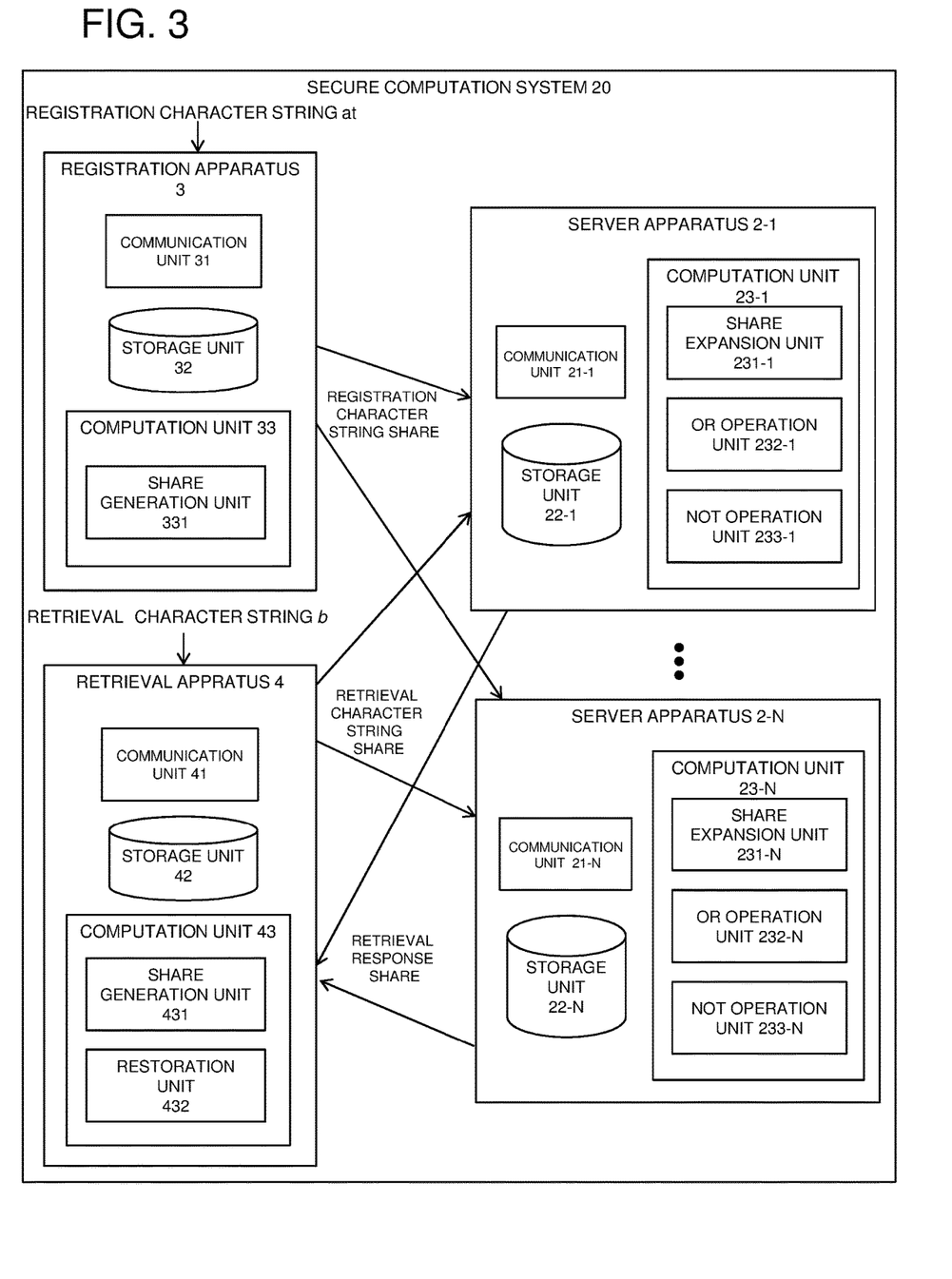
FIG. 3 is a block diagram illustrating an example of a configuration of a secure computation system according to third and fourth example embodiments.

FIG. 3 is a block diagram illustrating an example of a configuration of a secure computation system 20 according to the present example embodiment. With reference to FIG. 3, the secure computation system 20 comprises a register apparatus 3, a retrieval apparatus 4, and server apparatuses 2-1 to 2-N. The register apparatus 3 and the retrieval apparatus 4 may be different apparatuses, or may be same apparatuses. In a similar manner, at least one of the server apparatuses 2-1 to 2-N may comprise functions of the register apparatus 3 and the retrieval apparatus 4.

In the present example embodiment, the register apparatus 3 registers character strings to server apparatuses 2-1 to 2-N. The register apparatus 3 that registers character strings may be a different apparatus for respective character strings to be registered, or may be a same apparatus for the respective character strings. As an example, assumed a situation where the same apparatus registers all character strings, FIG. 3 shows a situation where the same apparatus registers t-th character string $a_t$.

In addition, in the present example embodiment, the retrieval apparatus 4 retrieves character strings stored in the server apparatuses 2-1 to 2-N. The retrieval apparatus 4 may be different according to a retrieval character string b, or same for each of the retrieval character string b. In FIG. 3, assumed a situation where one retrieval apparatus 4 retrieves all character strings.

The register apparatus 3 comprises a communication unit 31, a storage unit 32, and a computation unit 33. In addition, the computation unit 33 comprises a share generation unit 331 that generates a share of a registration character string.

The retrieval apparatus 4 comprises a communication unit 41, a storage unit 42, and a computation unit 43. In addition, the computation unit 43 comprises a share generation unit 431 that generates a share of a retrieval character string, and a restoration unit 432.

A server apparatus 2-$n$ ($n=1, \ldots, N$) comprises a communication unit 21-$n$, a storage unit 22-$n$, and a computation unit 23-$n$. In addition, the computation unit 23-$n$ comprises a share expansion unit 231-$n$, an OR computation unit 232-$n$, and a NOT operation unit 233-$n$.

(Operation)

Next, Details of operations of the secure computation system 20 according to the present example embodiment will be described.

{Registration Procedure}

Here, assumed that $a=a[1] \ldots a[U]$ is a target character string for registration. For $u=1, \ldots, U$, the share generation unit 331 of the register apparatus 3 computes shares $s[u, 1], \ldots, s[u, N]$ of $a[u]$ with similar procedures to those for generating shares of the present example embodiment. The communication unit 31 of the register apparatus 3 transmits the generated shares $s[u, 1], \ldots, s[u, N]$ to respective server apparatus 2-1 to 2-N. The server apparatus 2-1 to 2-N respectively store the received shares $s[u, 1], \ldots, s[u, N]$ in the storage units 22-1 to 22-N. The share expansion unit 231-$n$ ($n=1, \ldots, N$) compute, in advance, an extended share $s[u, n]$ at an arbitrary timing.

{Retrieval Procedure}

Here, assumed that $b=b[1] \ldots b[V]$ is a character string for which the retrieval apparatus performs querying. An object of the present example embodiment is to find a character string where the b is a partial character string of a character string $a=a[1] \ldots a[U]$ whose share is registered in the server apparatuses 2-1 to 2-N.

For $v=1, \ldots V$, the share generation unit 431 of the retrieval apparatus 4 computes a share of $b[v]$. The communication unit 41 of the register apparatus 4 transmits shares of the computed $b[v]$ to the server apparatuses 2-1 to 2-N. The share expansion unit 231-$n$ ($n=1, \ldots, N$) of the server apparatus 2-$n$ compute an extended shares for the share(s) of $b[v]$.

For respective character string $a=a[1] \ldots a[U]$ for which shares are registered, the server apparatuses 2-1 to 2-N compute $c[u, v]=(a[u]-b[u+v])^q$ by performing multi-party computation on subtraction and multiplication inputting extended shares of $a[u]$ for $u=1, \ldots, U-V$ and extended shares of $b[v]$ for $v=1, \ldots V$. Here, the q is an order of a finite field F.

For $u=1, \ldots, U-V$ and $v=1, \ldots V$, the NOT operation units 233-1 to 233-N of the server apparatuses 2-1 to 2-N compute extended shares of $d[u, v]=\text{NOT } c[u, v]$ based on extended shares of $c[u, v]$ by using the NOT operation of the first example embodiment.

For $u=1, \ldots, U-V$, the OR operation units 232-1 to 232-N of the server apparatuses 2-1 to 2-N compute extended shares of $e[u]=d[u, 1] \text{ OR } \ldots \text{ OR } d[u, V]$ based on extended shares of $d[u, v]$ by using the OR operation of the first example embodiment.

For $u=1, \ldots, U-V$, the NOT operation units 233-1 to 233-N of the server apparatuses 2-1 to 2-N compute extended shares of $f[u]=\text{NOT } e[u]$ based the extended shares of $e[u]$ by using the NOT operation of the first example embodiment.

The OR operation units 232-1 to 232-N of the server apparatuses 2-1 to 2-N compute an extended share(s) of $g=f[1] \text{ OR } \ldots \text{ OR } f[V]$ by using the OR operation of the first example embodiment.

The restoration unit 432 of the retrieval apparatus 4 restores the g based on shares of the g by using the restoration operation of the first example embodiment.

In a case where $g=1$, the restoration unit 432 determines that $a=a[1] \ldots a[U]$, then, transmits a share of $a[U]$ to the retrieval apparatus.

The restoration unit 432 determines $a=a[1], \ldots, a[U]$ restoring $a=a[1], \ldots, a[U]$ from a share of $a[1], \ldots,$ and a share of $a[U]$ by using the restoration operation of the first example embodiment.

According to the secure computation system 20 of the present example embodiment, in a case of performing to retrieve a character string based on multi-party computation, it is possible to reduce rounds number (count), and realize to retrieve a character string in high speed.

Fourth Example Embodiment

Next, a secure computation system according to a fourth example embodiment will be described. A configuration of the secure computation system according to the present example embodiment is similar to that of the secure computation system according to the third example embodiment (FIG. 3).

It should be noted that, the present example embodiment differs from the third example embodiment in a point where the present example embodiment uses the "OR operation", the "NOT operation", and the "restoration operation" according to the second example embodiment, instead of using the "OR operation", the "NOT operation", and the "restoration operation" according to the first example embodiment.

The secure computation system 20 of the present example embodiment causes the same effect as that caused by the secure computation system of the third example embodiment. That is, according to the present example embodiment, in a case of performing to retrieve a character string based on multi-party computation, it is possible to decrease number of rounds, and realize to retrieve a character string in high speed.

Further, according to the present disclosure, the following modes are possible.

(Mode 1)

A secure computation system may be the secure computation system according to the first aspect described above.

(Mode 2)

The secure computation system according to mode 1, wherein the share expansion units generate, as the extended shares, arrays whose components are a plurality of the shares, generating the plurality of the shares by performing secret sharing on the shares; wherein the OR operation units perform the OR operations by multiplying shares of random numbers of the finite field by respective components of the extended shares and by computing a summation of the respective multiplied values; and wherein the NOT operation units compute raised values by raising respective values shared by respective components of the extended shares to power of a value subtracted 1 from an order of the finite field; compute subtractions by subtracting the raised values from 1; compute products of the subtractions; and perform the NOT operations by performing multi-party computation on the products.

(Mode 3)

The secure computation system according to mode 2, wherein the shares are shares of the secret data of the finite field based on Shamir's secret sharing; and wherein the share expansion units generate the extended shares by adding a share of 0 of the finite field computed by Shamir's secret sharing to the shares of the secret data.

(Mode 4)

The secure computation system according to mode 1, wherein the share expansion units generate, as the extended shares, values where a plurality of shares generated by performing secret sharing on the shares are expressed as elements of an expansion field; wherein the OR operation units perform the OR operations by multiplying shares of random numbers in the expansion field by extended shares that are targets of an OR operation and by computing a summation of the respective summations of the respective multiplied value; and wherein the NOT computation units express, by components with elements of the expansion field, extended shares that become targets of a NOT operation; compute raised elements by raising the elements corresponding to respective components to power of an order of the finite field; compute multiplications of the raised elements with the respective components; compute a summation of the multiplications, compute products of values shared with the summation; compute raised value by raising the computed products to power of a value subtracted 1 from an order of the finite field; compute a subtraction by subtracting the raised value from 1; and perform the NOT operations by performing multi-party computation on the subtraction.

(Mode 5)

The secure computation system according to mode 4, wherein the shares are shares of the secret data of the finite field based on Shamir's secret sharing; and wherein the share expansion units generate the extended shares by adding a share of 0 in the expansion field computed by Shamir's secret sharing to the shares.

(Mode 6)

The secure computation system according to any one of modes 1 to 5, wherein the plurality of the server apparatuses store shares in the storage unit, wherein the shares are generated by performing secret sharing on respective words of a registration character string, and store shares in the storage unit, wherein the shares generated by performing secret sharing on respective words of a retrieval character string; wherein the plurality of the server apparatuses, by using the share expansion units, the OR computation units, and the NOT computation units, compute subtractions between the respective words of the registration character string and the respective words of the retrieval character string; compute raised values by raising the respective words of the retrieval character string to power of the subtraction; compute shares of the raised value; perform multi-party computation on the shares of the raised value by using the shares of the respective words of the registration character string and the shares of the respective words of the retrieval character string; perform multi-party computation on shares of OR values of the raised values by using shares of the raised values; perform multi-party computation on shares of NOT values of the OR values by using the shares of the OR values; and perform multi-party computation on OR values of the NOT values by using the shares of the NOT values; and wherein the retrieval apparatus determines whether or not the retrieval character string partially matches the registration character string based on the OR values of the computed NOT values.

(Mode 7)

A server apparatus that is one of the plurality of server apparatuses included in the secure computation system according to any one of modes 1 to 6.

(Mode 8)

A secure computation method may be the secure computation method according to the third aspect described above.

(Mode 9)

The secure computation method according to mode 8, used in the server apparatus, to perform: generating, as the extended shares, arrays whose components are a plurality of the shares, generating the plurality of the shares by performing secret sharing on the shares; performing the OR operations by multiplying shares of random numbers of the finite field by respective components of the extended shares and computing a summation of the respective multiplied values; computing values by raising respective values shared by respective components of the extended shares to power of a value subtracted 1 from an order of the finite field; computing subtractions by subtracting the raised values from 1; computing products of the subtractions; and performing the NOT operations by performing multi-party computation on the products.

(Mode 10)

The secure computation method according to mode 9, wherein the shares are shares of the secret data of the finite field based on Shamir's secret sharing; and used in the server apparatus, to perform: generating the extended shares by adding a share of 0 of the finite field computed by Shamir's secret sharing to the shares of the secret data.

(Mode 11)

The secure computation method according to mode 8, used in the server apparatus, to perform: generating, as the extended shares, values where a plurality of shares generated by performing secret sharing on the shares are expressed as elements of an expansion field; performing the OR operations by multiplying shares of random numbers in the expansion field by extended shares that are targets of an OR operation and by computing a summation of the respective summations of the respective multiplied value; expressing, by components with elements of the expansion field, extended shares that become targets of a NOT operation; computing raised values by raising the elements corresponding to respective components to power of an order of the finite field; computing multiplications of the raised elements with the respective components; computing a summation of the multiplications, computes products of values shared with the summation; computing raised values by raising the computed products to power of a value subtracted 1 from an order of the finite field; computes a subtraction by subtracting the raised values; and performing the NOT operations by performing multi-party computation on the subtraction.

(Mode 12)

The secure computation method according to mode 11, wherein the shares are shares of the secret data of the finite field based on Shamir's secret sharing, and used in the server apparatus, to perform: generating the extended shares by adding a share of 0 in the expansion field computed by Shamir's secret sharing to the shares.

(Mode 13)

A program may be the program according to the fourth aspect described above.

(Mode 14)

The program according to mode 13, causing the computer, to execute the processing of: generating, as the extended shares, arrays whose components are a plurality of the shares, generating the plurality of the shares by performing secret sharing on the shares; performing the OR operations by multiplying shares of random numbers of the finite field by respective components of the extended shares and by computing a summation of the respective multiplied values;

computing raised values by raising respective values shared by respective components of the extended shares to power of a value subtracted 1 from an order of the finite field; computing subtractions by subtracting the raised values from 1; computing products of the subtractions; and performing the NOT operations by performing multi-party computation on the products.

(Mode 15)

The program according to mode 14, wherein the shares are shares of the secret data of the finite field based on Shamir's secret sharing; causing the computer, to execute the processing of: generating the extended shares by adding a share of 0 of the finite field computed by Shamir's secret sharing to the shares of the secret data.

(Mode 16)

The program according to mode 13, causing the computer, to execute the processing of: generating, as the extended shares, values where a plurality of shares generated by performing secret sharing on the shares are expressed as elements of an expansion field; performing the OR operations by multiplying shares of random numbers in the expansion field by extended shares that are targets of an OR operation and by computing a summation of the respective summations of the respective multiplied value; expressing, by components with elements of the expansion field, extended shares that become targets of a NOT operation; computes raised elements by raising the elements corresponding to respective components to power of an order of the finite field; computing multiplications of the raised elements with the respective components; computing a summation of the multiplications, computes products of values shared with the summation; computes raised value by raising the computed products to power of a value subtracted 1 from an order of the finite field; computing a subtraction by subtracting the raised value from 1; and performing the NOT operations by performing multi-party computation on the subtraction.

(Mode 17)

The program according to claim 16, wherein the shares are shares of the secret data of the finite field based on Shamir's secret sharing; causing the computer, to execute the processing of: generating the extended shares by adding a share of 0 in the expansion field computed by Shamir's secret sharing to the shares.

The invention claimed is:

1. A secure computation system configured to perform multi-party computation on value of a predetermined function whose argument includes secret data, comprising:
    a plurality of server apparatuses;
    wherein the plurality of server apparatuses comprise:
    storage units that store shares that are elements of finite field generated by performing secret sharing on the secret data;
    share expansion units that generate extended shares by expanding the shares;
    OR operation units that perform OR operations included in the predetermined functions using the extended shares, and
    NOT operation units that perform NOT operations included in the predetermined functions using the extended shares
    wherein the plurality of the server apparatuses store shares in the storage units, wherein the shares are generated by performing secret sharing on respective words of a registration character string, and store shares in the storage units, wherein the shares generated by performing secret sharing on respective words of a retrieval character string;
    wherein the plurality of the server apparatuses, by using the share expansion units, the OR computation units, and the NOT computation units, compute subtractions between the respective words of the registration character string and the respective words of the retrieval character string, compute raised values by raisin the respective words of the retrieval character string to power of the subtraction, compute shares of the raised value; perform multi-party computation on the shares of the raised value by using the shares of the respective words of the registration character string and the shares of the respective words of the retrieval character string; perform multi-party computation on shares of OR values of the raised values by using shares of the raised values, perform multi-party computation on shares of NOT values of the OR values by using the shares of the OR values; and perform multi-party computation on OR values of the NOT values by using the shares of the NOT values; and
    wherein the retrieval apparatus determines whether or not the retrieval character string partially matches the registration character string based on the OR values of the computed NOT values.

2. The secure computation system according to claim 1, wherein the share expansion units generate, as the extended shares, arrays whose components are a plurality of the shares, generating the plurality of the shares by performing secret sharing on the shares;
    wherein the OR operation units perform the OR operations by multiplying shares of random numbers of the finite field by respective components of the extended shares and by computing a summation of the respective multiplied values; and
    wherein the NOT operation units compute raised values by raising respective values shared by respective components of the extended shares to power of a value subtracted I from an order of the finite field; compute subtractions by subtracting the raised values from 1; compute products of the subtractions; and perform the NOT operations by performing multi-party computation on the products.

3. The secure computation system according to claim 2, wherein the shares are shares of the secret data of the finite field based on Shamir's secret sharing; and
    wherein the share expansion units generate the extended shares by adding a share of 0 of the finite field computed by Shamir's secret sharing to the shares of the secret data.

4. The secure computation system according to claim 1, wherein the share expansion units generate, as the extended shares, values where a plurality of shares generated by performing secret sharing on the shares are epressed as base elements of an expansion field;
    wherein the OR operation units perform the OR operations by multiplying shares of random numbers in the expansion field by extended shares that are targets of an OR operation, and by computing a summation of the respective summations of the respective multiplied value; and
    wherein the NOT computation units express, by components with elements of the expansion field, extended shares that become targets of a NOT operation; compute raised elements by raising the elements corresponding to respective components to power of an order of the finite field; compute multiplications of the raised elements with the respective components compute a summation of the multiplications, compute products of values shared with the summation; compute raised value by raising the computed products to power of a value subtracted 1 from an order of the finite field; compute a subtraction by subtracting the raised value from 1; and perform the NOT operations by performing multi-party computation on the subtraction.

5. The secure computation system according to claim 4, wherein the shares are shares of the secret data of the finite field based on Shamir's secret sharing; and
wherein the share expansion units generate the extended shares by adding a share of 0 in the expansion field computed by Shamir's secret sharing to the shares.

6. A server apparatus that is one of the plurality of server apparatuses included in the secure computation system according to claim 1.

7. A server apparatus that is one of the plurality of server apparatuses included in the secure computation system according to claim 2.

8. A server apparatus that is one of the plurality of server apparatuses included in the secure computation system according to claim 3.

9. A server apparatus that is one of the plurality of server apparatuses included in the secure computation system according to claim 4.

10. A server apparatus that is one of the plurality of server apparatuses included in the secure computation system according to claim 5.

11. A secure computation method, used in a plurality of computers that perform a multi-party computation on value of a predetermined function whose argument includes secret data, comprising:
receiving shares that are elements of a finite field generated by performing secret sharing on the secret data;
generating extended shares by expanding the shares;
performing OR operations included in the predetermined functions using the extended shares; and
performing NOT operations included in the predetermined functions using the extended shares,
wherein the shares are generated by performing secret sharing on respective words of a registration character string and the shares generated by performing secret sharing on respective words of a retrieval character string;
wherein the method further comprises:
computing subtractions between the respective words of the registration character string and the respective words of the retrieval character string, computing raised values by raising the respective words of the retrieval character string to power of the subtraction; computing shares of the raised value; performing multi-part computation on the shares of the raised value by using the shares of the respective words of the registration character string and the shares of the respective words of the retrieval character string; performing multi-party computation on shares of OR values of the raised values by using shares of the raised values, performing multi-party computation on shares of NOT values of the OR values by using the shares of the OR values; and performing multi-party computation on OR values of the NOT values by using the shares of the NOT values; and
determining whether or not the retrieval character string partially matches the registration character string based on the OR values of the computed NOT values.

12. The secure computation method according to claim 11, used in the server apparatus, to perform:
generating arrays whose components are a plurality of the shares as the extended shares, generating the plurality of the shares by performing secret sharing on the shares;
performing the OR operations by multiplying shares of random numbers of the finite field by respective components of the extended shares and computing a summation of the respective multiplied values;
computing values by raising respective values shared by respective components of the extended shares to power of a value subtracted 1 from an order of the finite field;
computing subtractions by subtracting the raised values from 1;
computing products of the subtractions; and
performing the NOT operations by performing multi-party computation on the products.

13. A non-transitory computer-readable recording medium storing thereon a program causing one of a plurality of computers to perform a multi-party computation on value of a predetermined function whose argument includes secret data, to execute the processings of:
receiving shares that are elements of a finite field generated by performing secret sharing on the secret data;
generating extended shares by expanding the shares;
performing OR operations included in the predetermined functions using the extended shares; and
performing NOT operations included in the predetermined functions using the extended shares:
wherein the shares are generated by performing secret sharing on respective words of a registration character string and the shares generated by performing secret sharing on respective words of a retrieval character string,
wherein the processing further comprises:
computing subtractions between the respective words of the registration character string and the respective words of the retrieval character string, computing raised values by raising the respective words of the retrieval character string to power of the subtraction; computing shares of the raised value; performing multi-party computation on the shares of the raised value by using the shares of the respective words of the registration character string rind the shares of the respective words of the retrieval character string; performing multi-party computation on shares of OR values of the raised values by using shares of the raised values; performing multi-party computation on shares of NOT values of the OR values by using the shares of the OR values; and performing multi-party computation on OR values of the NOT values by using the shares of the NOT values, and
determining whether or not the retrieval character string partially matches the registration character string based on the OR values of the computed NOT values.

* * * * *

UNITED STATES PATENT AND TRADEMARK OFFICE
CERTIFICATE OF CORRECTION

| | | |
|---|---|---|
| PATENT NO. | : 10,749,671 B2 | Page 1 of 1 |
| APPLICATION NO. | : 15/562659 | |
| DATED | : August 18, 2020 | |
| INVENTOR(S) | : Isamu Teranishi | |

It is certified that error appears in the above-identified patent and that said Letters Patent is hereby corrected as shown below:

In the Specification

Column 9, Preferred Modes, Line 16; Before "elements", delete "bases"

In the Claims

Column 19, Line 53; In Claim 1, before "finite", insert --a--

Column 19, Line 60; In Claim 1, delete "shares," and insert --shares;-- therefor Column 20, Line 9; In Claim 1, delete "raisin" and insert --raising-- therefor Column 20, Line 40; In Claim 2, delete "I" and insert --1-- therefor Column 20, Line 56; In Claim 4, delete "epressed" and insert --expressed-- therefor Column 20, Line 56; In Claim 4, before "elements", delete "base"

Column 21, Line 2; In Claim 4, after "components", insert --;--

Column 22, Line 35; In Claim 13, delete "shares:" and insert --shares,-- therefor Column 22, Line 50; In Claim 13, delete "rind" and insert --and-- therefor Signed and Sealed this
Twenty-second Day of December, 2020

Andrei Iancu
*Director of the United States Patent and Trademark Office*